US012563026B2

(12) United States Patent
Lyu et al.

(10) Patent No.: US 12,563,026 B2
(45) Date of Patent: Feb. 24, 2026

(54) METHOD AND APPARATUS FOR ACCOUNT ASSOCIATION, AND COMPUTER DEVICE AND STORAGE MEDIUM

(71) Applicant: GUANGDONG OPPO MOBILE TELECOMMUNICATIONS CORP., LTD., Dongguan (CN)

(72) Inventors: Xiaoqiang Lyu, Dongguan (CN); Zhao Ru, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 217 days.

(21) Appl. No.: 18/430,564

(22) Filed: Feb. 1, 2024

(65) Prior Publication Data

US 2024/0179142 A1 May 30, 2024

Related U.S. Application Data

(63) Continuation of application No. PCT/CN2021/112626, filed on Aug. 13, 2021.

(51) Int. Cl.
*H04L 9/40* (2022.01)

(52) U.S. Cl.
CPC ................................ *H04L 63/0815* (2013.01)

(58) Field of Classification Search
CPC ............................. H04L 63/0815; H04L 9/32
See application file for complete search history.

(56) References Cited

U.S. PATENT DOCUMENTS

2020/0005278 A1* 1/2020 Vudathu ............... G06Q 20/227
2020/0380510 A1* 12/2020 Hare ................... G06Q 20/123

FOREIGN PATENT DOCUMENTS

| CN | 107995215 A | 5/2018 |
| CN | 108055339 A | 5/2018 |
| CN | 110944035 A | 3/2020 |
| CN | 112600856 A | 4/2021 |

OTHER PUBLICATIONS

OCF_ Cloud_ API_ For_ Cloud_ Services_ Specification_ V2.2.2; Cloud and cloud interconnection access solutions; 2021.1; Refer to the three chapters of 5/6/7.
International Search Report and Written Opinion, International Application No. PCT/CN2021/112626, mailed May 9, 2022 (14 pages).

* cited by examiner

*Primary Examiner* — Huan V Doan
(74) *Attorney, Agent, or Firm* — Ladas & Parry LLP

(57) ABSTRACT

The present application belongs to the technical field of Internet of Things. Disclosed are a method for account association, and a computer device. The method is executed by a client device, and includes: obtaining an authorization code from an authorizing platform, and the authorizing platform is one of a first cloud platform and a second cloud platform, and the first cloud platform is a cloud platform to which the client device belongs; and sending the authorization code to an authorized platform, wherein the authorization code is configured for performing account association interaction between the authorized platform and the authorizing platform, such that a first account is associated with a second account. During the account association interaction process in the present solution, the capacity burden and the complexity of a client is reduced, and the efficiency of the development, update and maintenance of the client is improved.

20 Claims, 7 Drawing Sheets

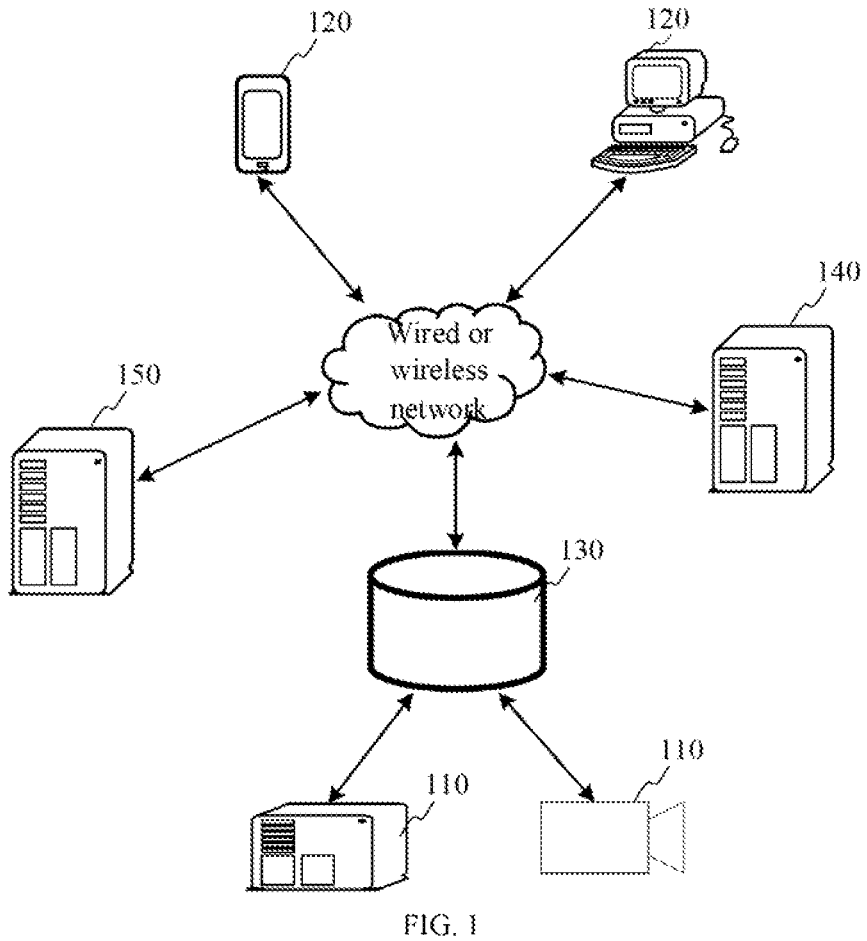

FIG. 1

201 obtaining an authorization code from an authorizing platform; wherein the authorizing platform is one of a first cloud platform and a second cloud platform; and the first cloud platform is a cloud platform to which the client device belongs

202 sending the authorization code to an authorized platform; wherein the authorization code is configured for account association interaction between the authorized platform and the authorizing platform, so as to associate a first account with a second account; wherein the first account is a user account of the client device logging in the first cloud platform, and the second account is a user account of the client device logging in the second cloud platform; and the authorized platform is another cloud platform other than the authorizing platform in the first cloud platform and the second cloud platform

FIG. 2

301 sending an authorization code to a client device; wherein the authorization code is configured to be sent to an authorized device by the client device; the first cloud platform is a cloud platform to which the client device belongs

302 performing account association interaction with the authorized platform based on the authorization code to associate a first account and a second account; wherein the authorized platform is another cloud platform other than the authorizing platform in the first cloud platform and the second cloud platform;

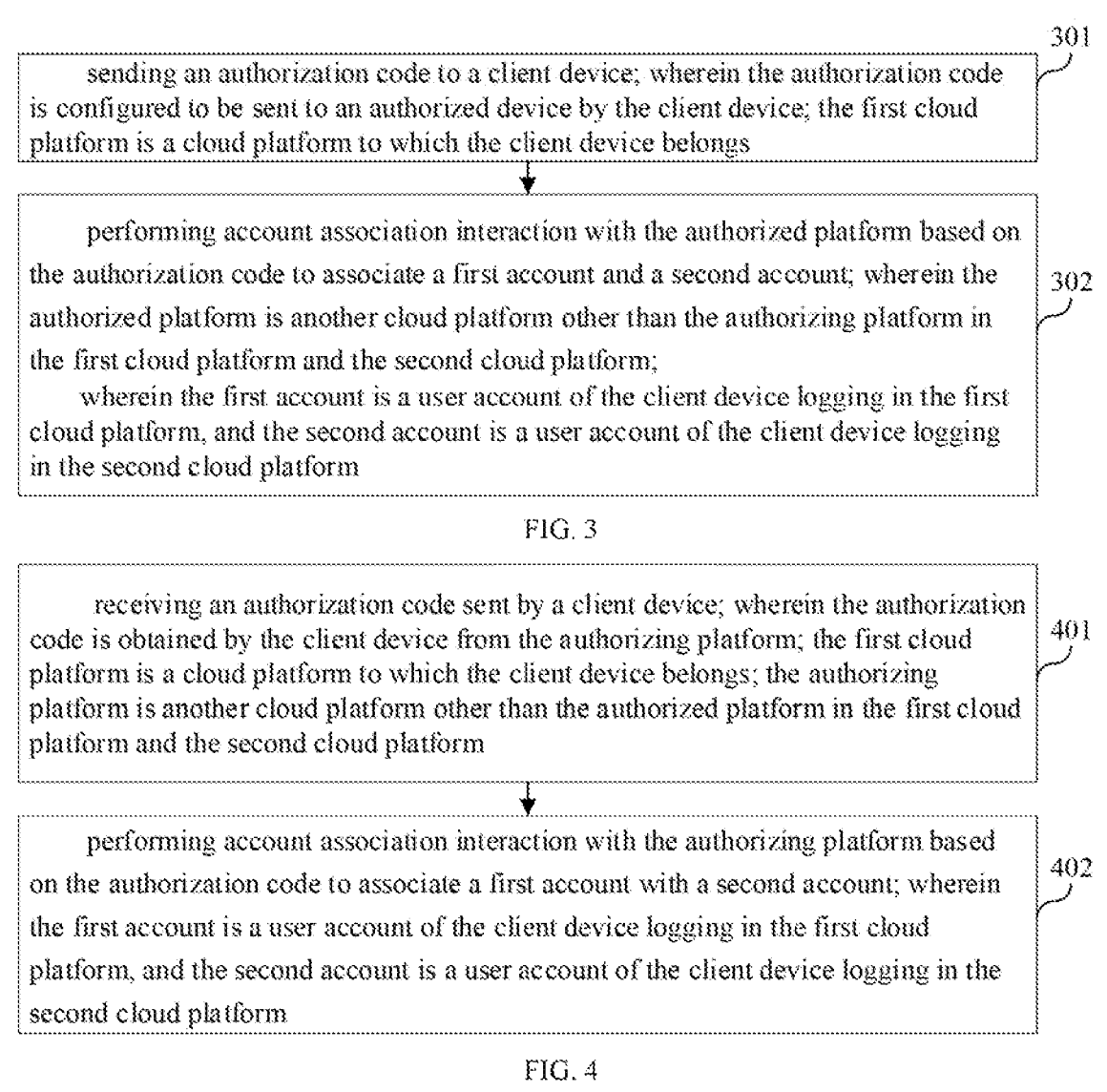

wherein the first account is a user account of the client device logging in the first cloud platform, and the second account is a user account of the client device logging in the second cloud platform

FIG. 3

401 receiving an authorization code sent by a client device; wherein the authorization code is obtained by the client device from the authorizing platform; the first cloud platform is a cloud platform to which the client device belongs; the authorizing platform is another cloud platform other than the authorized platform in the first cloud platform and the second cloud platform

402 performing account association interaction with the authorizing platform based on the authorization code to associate a first account with a second account; wherein the first account is a user account of the client device logging in the first cloud platform, and the second account is a user account of the client device logging in the second cloud platform

FIG. 4

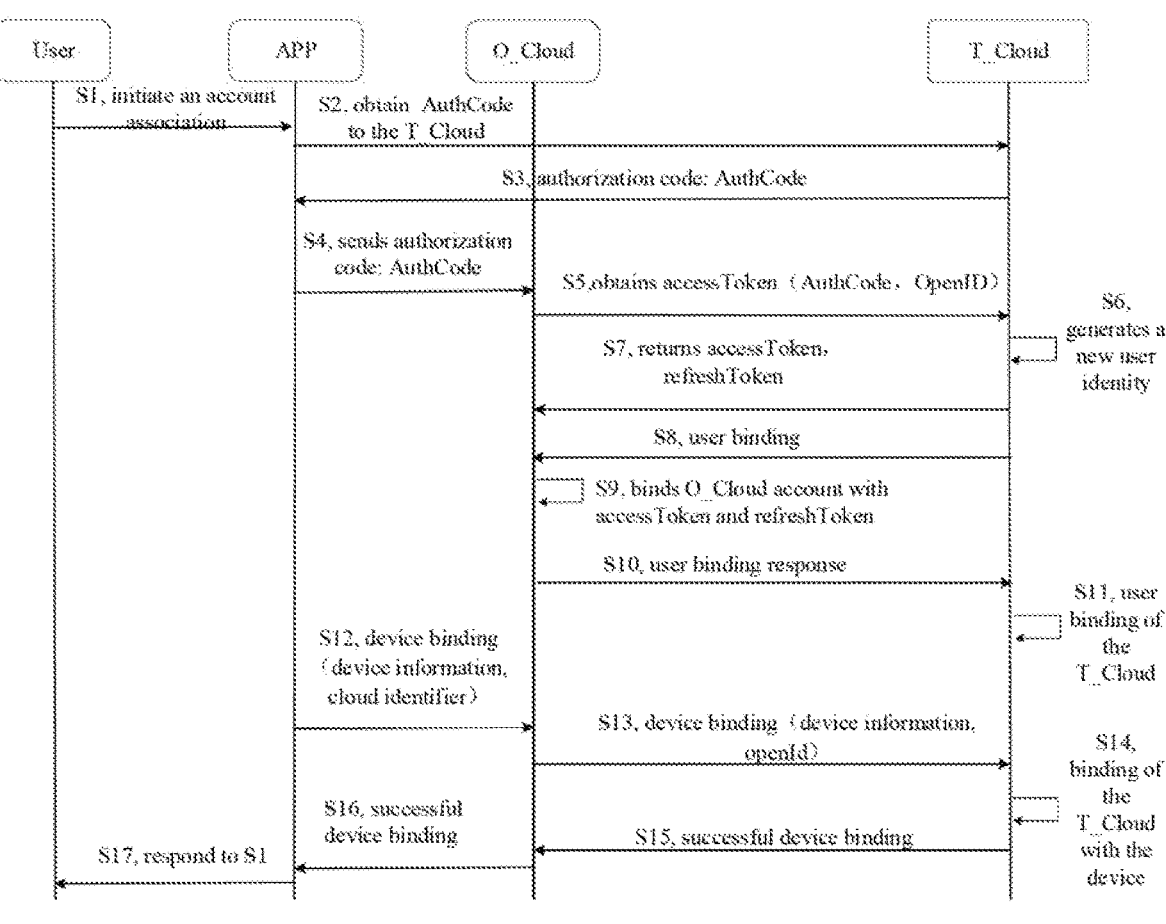
FIG. 8
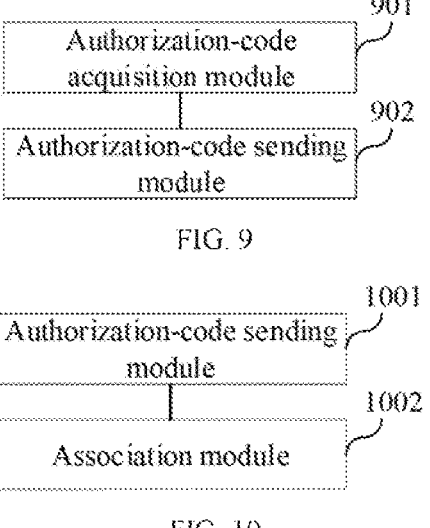
FIG. 9
FIG. 10

METHOD AND APPARATUS FOR ACCOUNT ASSOCIATION, AND COMPUTER DEVICE AND STORAGE MEDIUM

CROSS-REFERENCE TO RELATED APPLICATIONS

This application is a continuation of International Patent Application No. PCT/CN2021/112626, filed on Aug. 13, 2021, the content of which is herein incorporated by reference in their entirety.

TECHNICAL FIELD

The present disclosure relates to the technical field of the Internet of Things, and in particular to a method, a device, a computer device and a storage medium for account association.

BACKGROUND

In Internet of Things (IOT), a server-side device may be accessed to a cloud platform, and a client device may manage and control the server-side device through the cloud platform.

Multiple server-side devices owned by a same user may belong to different cloud platforms. If the user wants to manage the server-side devices in different cloud platforms through an application, the user needs to establish association relationship between the user's accounts in multiple cloud platforms. In the related art, a cloud platform service provider may add a program module associated with other cloud platforms in the application program corresponding to the cloud platform, and the program module in the application program is adopted to process intermediate information (such as an access token) to achieve secure account association.

However, in the related art, program modules associated with different cloud platforms need to be added to the application program in the client device, which increases complexity of the application program in the client device and reduces efficiency of application development and maintenance.

SUMMARY OF THE DISCLOSURE

In an aspect, the embodiments of the present disclosure provide a method for account association. The method is performed by a client device. The method includes: obtaining an authorization code from an authorizing platform, in which the authorizing platform is one of a first cloud platform and a second cloud platform, and the first cloud platform is a cloud platform to which the client device belongs; and sending the authorization code to an authorized platform, in which the authorization code is configured for account association interaction between the authorized platform and the authorizing platform, so as to associate a first account with a second account. The first account is a user account of the client device logging in the first cloud platform, and the second account is a user account of the client device logging in the second cloud platform; and the authorized platform is another cloud platform other than the authorizing platform in the first cloud platform and the second cloud platform.

In a second aspect, the embodiments of the present disclosure provide a method for account association. The method is performed by an authorizing platform, and the authorizing platform is one of a first cloud platform and a second cloud platform. The method includes: sending an authorization code to a client device, in which the authorization code is configured to be sent to an authorized device by the client device, and the first cloud platform is a cloud platform to which the client device belongs; and performing account association interaction with the authorized platform based on the authorization code to associate a first account and a second account, in which the authorized platform is another cloud platform other than the authorizing platform in the first cloud platform and the second cloud platform. The first account is a user account of the client device logging in the first cloud platform, and the second account is a user account of the client device logging in the second cloud platform.

In a third aspect, the embodiments of the present disclosure provide an IoT device. The IoT device is implemented as a client device, and the IoT device includes a processor, a memory, and a transceiver. The processor is configured to execute an instruction stored in the memory to implement the method for account association described above.

BRIEF DESCRIPTION OF THE DRAWINGS

In order to explain the technical solutions in the embodiments of the present disclosure more clearly, the drawings needed to be used in the description of the embodiments will be briefly introduced below. Obviously, the drawings in the following description are only some embodiments of the present disclosure. For those skilled in the art, other drawings may be obtained based on these drawings without exerting creative efforts.

FIG. 1 is a schematic diagram of a network architecture of an IoT according to an embodiment of the present disclosure.

FIG. 2 is a flow chart of a method for account association according to an embodiment of the present disclosure.

FIG. 3 is a flow chart of a method for account association according to an embodiment of the present disclosure.

FIG. 4 is a flow chart of a method for account association according to an embodiment of the present disclosure.

FIG. 8 is a schematic diagram of a binding of an account and a device involved in the embodiment illustrated in FIG. 7.

FIG. 9 is a block diagram of a device for account association according to an embodiment of the present disclosure.

FIG. 10 is a block diagram of a device for account association according to an embodiment of the present disclosure.

DETAILED DESCRIPTION

Figure 5:
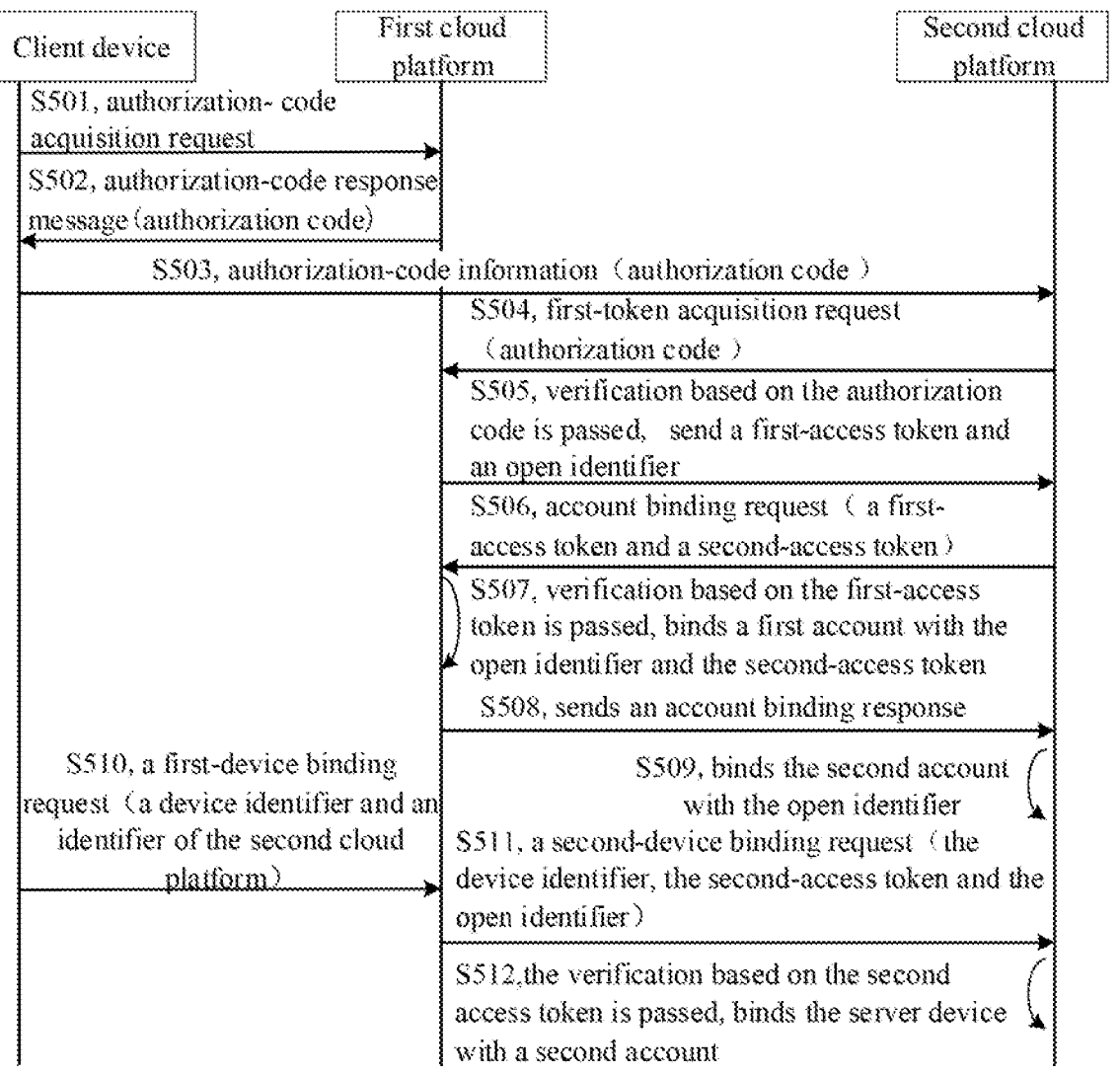
FIG. 5 is a flow chart of a method for account association according to an embodiment of the present disclosure.

In order to make the purpose, technical solutions and advantages of the present disclosure clearer, the embodiments of the present disclosure will be further described in detail below with reference to the accompanying drawings.

Network architectures and business scenarios described in the embodiments of the present disclosure are to more clearly explain the technical solutions of the embodiments of the present disclosure, and do not constitute a limitation on the technical solutions provided by the embodiments of the present disclosure. Those skilled in the art will know that with the network architecture evolution and the emergence of new business scenarios, the technical solutions provided in the embodiments of the present disclosure are further applicable to similar technical problems.

As illustrated in FIG. 1, which is a schematic diagram of a network architecture of an IoT according to an embodiment of the present disclosure. The network architecture of the IoT may include a client device 120, a first cloud platform 140 and a second cloud platform 150. In some embodiments, the network architecture may further include a server-side device 110, a gateway device 130, etc.;

In an embodiment, the client device 120 is a user-side terminal device. For example, the client device may be a smartphone, a tablet, a smart watch, a smart TV, etc.; or the client device may further be a personal computer, such as a desktop computer, a portable computer, a personal worksta-tion, etc.

In an embodiment, the client device 120 is a client entity (which may be a virtual entity), the running of which is based on a terminal device. For example, the client device 120 may be an application (APP) running on a terminal device and configured to perform operations such as access, control, and management on the service-side device.

The first cloud platform 140 and the second cloud plat-form 150 are servers deployed on the network-side.

The server-side device 110 may be a device configured to provide functional services of the IoT.

For example, the server-side device 110 may be a smart home device, such as a smart lamp, a smart TV, a smart air conditioner, a smart refrigerator, a smart microwave oven, a smart rice cooker, a sweeping robot, etc.

Alternatively, the server device 110 may be an industrial production device, such as a lathe, an industrial robot, a solar panel, a wind turbine, etc.

Alternatively, the server device 110 may be a commercial service device, such as an unmanned vending machine, etc.

Alternatively, the server device 110 may be an intelligent monitoring device, such as a surveillance camera, an infra-red sensor, a sound sensor, a temperature sensor, etc.

Multiple server devices 110 may be accessed to the first cloud platform 140 and the second cloud platform 150 respectively.

The gateway device 130 is a network device implement-ing network interconnection above a network layer, and is also called an inter-network connector, a protocol converter, etc. The gateway device 130 provides network connection services for the server device 110.

The gateway device 130 may be a professional gateway, such as a home gateway, or the gateway device 130 may be an access device with a gateway function, such as a router with the gateway function.

In the embodiments of the present disclosure, the above-mentioned server device 110, the client device 120, the gateway device 130, the first cloud platform 140 and the second cloud platform 150 may be IoT devices that meet industry standards. For example, they may be IoT devices that meet the requirements standardized by Open Connec-tivity Foundation (OCF).

The server device 110 and the gateway device 130 are connected through a wired or wireless network. The first cloud platform 140 and the second cloud platform 150 may be connected to the gateway device 130 and the client device 120 through the wired or wireless network respectively.

In some embodiments, the above-mentioned wired or wireless network applies to standard communication tech-nologies and/or protocols. For example, the above wired or wireless network may be a communication network based on an IoT protocol.

In an IoT scenario (such as a smart home scenario), the user may have an account in two cloud platforms (namely, an original cloud and a target cloud) at the same time; each cloud has some server devices; the user may want a unified view for devices associated with both cloud platforms.

In the related art, a client (i.e., the client device installed with an application) of the origin cloud registering to the target cloud is a prerequisite for it to initiate an OAuth2.0 authorization code grant type flow.

After the client registers to the target cloud, the client of the origin cloud obtains a client ID, a client secret and other information.

Afterwards, the origin cloud may request an authorization code (AuthCode) from the target cloud based on the client ID and the client secret obtained in the above operations, and then the client uses the AuthCode to obtain an access token and a refresh token. The access token identifies a user identifier of the user logged in the client in the target cloud.

After obtaining the above-mentioned access token, the origin cloud may associate the above-mentioned token with a local UserID. The user may request information about all devices (server devices in the origin cloud and server devices in the target cloud) of the origin cloud through the origin cloud, and carry out relevant management and control operations.

After obtaining the access token, the origin cloud may obtain allowable device information of the server device in the target cloud through a device API provided by the target cloud.

In the related art, the process of associating user accounts in different cloud platforms has not been standardized and is usually implemented by manufacturers themselves. A cur-rent manufacturer's implementation plan mainly integrates a target cloud-related software development kit (SDK), a quick application, a H5 program and other program modules on the client, and adopts these program modules to complete the association of a user account in the target cloud with a user account in the origin cloud and the binding of the device. Therefore, one client needs to integrate information such as SDKs or quick applications from different manu-facturers, which increases capacity burden and complexity of the client and has a great impact on the efficiency of the development, update and maintenance of the client.

As illustrated in FIG. 2, which is a flow chart of a method for account association according to an embodiment of the present disclosure. The method may be executed by a client device. For example, the client device may be the client device 120 of the network architecture illustrated in FIG. 1. The method may include the following operations.

At operation 201, obtaining an authorization code from an authorizing platform. The authorizing platform is one of a first cloud platform and a second cloud platform. The first cloud platform is a cloud to which the client device belongs.

The above-mentioned client device may run a manage-ment application (APP) corresponding to the first cloud platform, and the management APP may be configured to control and manage the client device for accessing to the first cloud platform.

In the embodiments of the present disclosure, the first cloud platform and the second cloud platform serve as an authorizing platform and an authorized platform respectively. In other words, the first cloud platform may be the authorizing platform and the second cloud platform may be the authorized platform; or the first cloud platform may be the authorized platform and the second cloud platform may be the authorizing platform.

In the embodiments of the present disclosure, the client device may request the authorizing platform to issue an authorization code (AuthCode) to the authorized platform.

For example, after establishing a connection with the first cloud platform, the management APP may request the authorizing platform of the first cloud platform and the second cloud platform to obtain the authorization code of the authorized platform.

At operation 202, sending the authorization code to the authorized platform. The authorization code is configured for account association interaction between the authorized platform and the authorizing platform to associate a first account with a second account. The first account is a user account of the client device logging in the first cloud platform. The second account is a user account of the client device logging in the second cloud platform. The authorized platform is another cloud platform other than the authorized platform in the first cloud platform and the second cloud platform.

In the embodiments of the present disclosure, after requesting the authorization code, the client device may send the authorization code to the authorized platform. The authorized platform and the authorizing platform may verify the account association interaction based on the authorization code to ensure security of the account association.

The first cloud platform has the first account assigned to the user to log in the client device, and the second cloud platform has the second account assigned to the user to log in the client device. Since the first cloud platform and the second cloud platform are two different cloud platforms and may belong to two different ecosystems. Accordingly, account systems of the two cloud platforms are usually independent and may not be directly interchangeable. Through the technical solution illustrated in the embodiments of the present disclosure, the first cloud platform and the second cloud platform may associate the accounts assigned to the same user.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. Then the authorization code is provided to the authorized platform, such that the subsequent account association interaction between the authorizing platform and the authorized platform may be carried out through the authorization code. Since the account association interaction process does not require the participation of the client device, there is also no need to integrate program modules associated with other cloud platforms in the applications installed on the client device, thereby reducing capacity burden and complexity of the client device and improving efficiency of development, update and maintenance of the client.

As illustrated in FIG. 3, which is a flow chart of a method for account association according to an embodiment of the present disclosure. The method may be executed by an authorizing platform. For example, the authorizing platform may be one of the first cloud platform 140 and the second cloud platform 150 in the network architecture illustrated in FIG. 1. The method may include the following operations.

At operation 301, sending an authorization code to a client device. The authorization code is configured to be provided to the authorized platform by the client device. The first cloud platform is a cloud platform to which the client device belongs.

At operation 302, performing account association interaction with the authorized platform based on the authorization code, so as to associate the first account and the second account. The authorized platform is another cloud platform other than the authorized platform in the first cloud platform and the second cloud platform. The first account is a user account of the client device logging in the first cloud platform, and the second account is a user account of the client device logging in the second cloud platform.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. Then the authorization code is provided to the authorized platform. The authorizing platform and the authorized platform may interact with each other through the authorization code. The account association interaction process does not require the participation of the client device. Therefore, there is no need to integrate program modules associated with other cloud platforms in the application installed on the client device, thereby reducing capacity burden and complexity of the client and improving efficiency of the development, update and maintenance of the client.

As illustrated in FIG. 4, which is a flow chart of a method for account association according to an embodiment of the present disclosure. The method may be executed by an authorized platform. For example, the authorized platform may be one of the first cloud platform 140 and the second cloud platform 150 in the network architecture illustrated in FIG. 1. The method may include the following operations.

At operation 401, receiving an authorization code sent by a client device. The authorization code is obtained by the client device from an authorizing platform. The first cloud platform is the cloud platform to which the client device belongs. The authorizing platform is another cloud platform other than one of the first cloud platform and the second cloud platform.

At operation 402, performing account association interaction with the authorizing platform based on the authorization code, so as to associate a first account and a second account. The first account is a user account of the client device logging in the first cloud platform, and the second account is a user account of the client device logging in the second cloud platform.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. Then the authorization code is provided to the authorized platform. The authorizing platform and the authorized platform may interact with each other through the authorization code. The account association interaction process does not require the participation of the client device. Therefore, there is no need to integrate program modules associated with other cloud platforms in the application installed on the client device, thereby reducing capacity burden and complexity of the client and improving efficiency of the development, update and maintenance of the client.

In an embodiment, the above-mentioned authorizing platform may be the first cloud platform, and the authorized platform may be the second cloud platform. In other words, after obtaining the authorization code issued by the first cloud platform, the second cloud platform may initiate the process of account association with the first cloud platform.

As illustrated in FIG. 5, which is a flow chart of a method for account association according to an embodiment of the present disclosure. The method may be executed interactively between the client device, the first cloud platform and the second cloud platform. The method may include the following operations.

At operation 501, the client device sends an authorization-code acquisition request to the first cloud platform; and the first cloud platform receives the authorization-code acquisition request.

In the embodiments of the present disclosure, the authorization-code acquisition request may include an identifier of the second cloud platform. The identifier of the second cloud platform may be obtained from the first cloud platform when the second cloud platform registers with the first cloud platform in advance.

The second cloud platform may register with the first cloud platform in advance. After the registration is completed, the first cloud platform may have the identifier of the second cloud platform, an address of the second cloud platform and other information. Afterwards, the client device establishes a connection with the first cloud platform. The first cloud platform may provide the identifier of the second cloud platform to the client device. When the user wants to establish an account association between the first cloud platform and the second cloud platform, the client device may select the identifier of the second cloud platform and initiate account association process. At this time, the client device may send the authorization-code acquisition request including the identifier of the second cloud platform to the first cloud platform, thereby requesting the authorization code for the second cloud platform.

At operation 502, the first cloud platform sends an authorization-code response message to the client device; the client device receives the authorization-code response message sent by the first cloud platform, and the authorization-code response message includes the authorization code.

The first cloud platform generates the authorization-code response message based on the identifier of the second cloud platform included in the authorization-code acquisition request. The authorization-code response message includes the authorization code assigned to the second cloud platform.

In an embodiment, the above authorization-code response message may further include the address of the second cloud platform. The address of the second cloud platform may be obtained by the first cloud platform based on the identifier of the second cloud platform included in the authorization-code acquisition request.

In the embodiments of the present disclosure, the first cloud platform may store the above-mentioned authorization code and the identifier of the second cloud platform, such that the authorization code may be verified in the subsequent account association process.

At operation 503, the client device sends authorization-code information to the second cloud platform. Correspondingly, the second cloud platform receives the authorization-code information sent by the client device; and the authorization-code information includes the authorization code.

In an embodiment, the above authorization-code response message further includes the address of the second cloud platform. When sending the authorization-code information to the second cloud platform, the client device sends the authorization-code information to the second cloud platform based on the address of the second cloud platform.

In an embodiment, the authorization-code information further includes at least one of an identifier of the first cloud platform and an identifier of the client device in the second cloud platform.

The identifier of the first cloud platform may be an address of the first cloud platform, such as a uniform resource locator (URL).

The identifier of the client device in the second cloud platform may be an identifier assigned to the client device by the second cloud platform when the client device registers with the second cloud platform.

After the second cloud platform obtains the authorization code requested by the client device, the first cloud platform and the second cloud platform may perform account association interaction based on the authorization code to associate the first account with the second account. The first account is the user account of the client device logging in the first cloud platform, and the second account is the user account of the client device logging in the second cloud platform. For the above account association interaction process, please refer to subsequent operations 504 to 509.

At operation 504, the second cloud platform sends a first-token acquisition request to the first cloud platform; the first cloud platform receives the first-token acquisition request sent by the second cloud platform; and the first-token acquisition request includes the authorization code.

In the embodiments of the present disclosure, the second cloud platform may request a token from the first cloud platform based on the authorization code.

At operation 505, after a verification based on the authorization code is passed, the first cloud platform sends a first-access token and an open identifier to the second cloud platform; and the second cloud platform receives the first-access token and the open identifier sent by the first cloud platform.

The above-mentioned open identifier is an identifier assigned to the client device by the first cloud platform. For example, the open identifier may be an identifier assigned by the first cloud platform to the user corresponding to the client device, and the identifier is different from the first account. The open identifier is configured to subsequently associate the first account in the first cloud platform with the second account in the second cloud platform.

The above-mentioned first-access token is used by the second cloud platform to send a user binding request to the first cloud platform.

In the embodiments of the present disclosure, after receiving the first-token acquisition request sent by the second cloud platform, the first cloud platform may query the authorization code corresponding to the second cloud platform, and compare the queried authorization code with the authorization code in the first-token acquisition request. If the two match, it is determined that the verification based on the authorization code is passed. Afterwards, the first cloud platform may send the first-access token and the open identifier (OpenID) to the second cloud platform.

For example, the first cloud platform may compare the queried authorization code with the authorization code in the first-token acquisition request. If the two are the same authorization code, it is determined that they match; otherwise, it is determined that they do not match.

When querying the authorization code corresponding to the second cloud platform, the first cloud platform may query the authorization code corresponding to the second cloud platform according to the identifier of the second cloud platform carried in the first-token acquisition request.

In an embodiment, after receiving the above-mentioned first-access token and the open identifier, the second cloud platform may generate the second account for the user corresponding to the client device.

The second cloud platform may generate the second account based on the above-mentioned open identifier.

Alternatively, the second cloud platform may further generate the second account through other methods. For example, the second cloud platform may randomly generate the second account for the user corresponding to the client device. The embodiments of the present disclosure do not limit the method of generating the second account.

At operation 506, the second cloud platform sends an account binding request to the first cloud platform; the first cloud platform receives the account binding request sent by the second cloud platform, and the account binding request includes the first-access token and a second-access token.

In the embodiments of the present disclosure, the second cloud platform may generate the second-access token, and then request the first cloud platform to perform the account association based on the first-access token and the second-access token.

The second-access token is configured to access the second cloud platform by the first cloud platform.

At operation 507, after the verification based on the first-access token is passed, the first cloud platform binds the first account with the open identifier and the second-access token.

After receiving the above account binding request, the first cloud platform may verify the account binding of the first-access token. For example, the first cloud platform may query the first-access token allocated for the second cloud platform based on the identifier of the second cloud platform carried in the account binding request. Then the first cloud platform may compare the queried first-access token with the first-access token carried in the account binding request. If the two match (for example, both are the same authorization code), it is determined that the verification based on the first-access token is passed. Afterwards, the first account of the user corresponding to the client device in the first cloud platform is bound with the above-mentioned open account, and the first account may be bound with the second-access token.

In some embodiments, the first cloud platform may further bind the first account with the identifier of the second cloud platform.

In other words, the account binding request is configured to instruct the first cloud platform to bind the first account with the open identifier, the second-access token, and the identifier of the second cloud platform. Accordingly, the first cloud platform binds the first account with the open identifier, the second-access token and the identifier of the second cloud platform according to the account binding request.

In an embodiment, when sending the first-access token and the open identifier to the second cloud platform, the first cloud platform may send the first-access token, the open identifier, the updated identifier of the first-access token, and the expiration time of the first-access token to the second cloud platform. Correspondingly, when receiving the first-access token and the open identifier, the second cloud platform may receive the first-access token, the open identifier, the updated token of the first-access token and the expiration time of the first-access token sent by the first cloud platform.

The updated token is configured to update the corresponding access token when the corresponding access token is expired.

The above expiration time may be configured to indicate a time point when the corresponding access token expires. For example, the expiration time may include the time point at which the corresponding access token expires, or the expiration time may further include an effective time point and a validity period of the corresponding access token.

In other words, the above-mentioned first-access token further has at least one of the updated token of the first-access token and the expiration time of the first-access token correspondingly. When sending the first-access token and the open identifier to the second cloud platform, the first cloud platform may further send the updated token of the first-access token to the second cloud platform. Correspondingly, the first cloud platform may further bind the first account with the updated token of the first-access token.

In an embodiment, the account binding request further includes the open identifier, an updated token of the second-access token, and an expiration time of the second-access token.

In other words, the above-mentioned second-access token further has the updated token of the second-access token and/or the expiration time of the second-access token correspondingly. The updated token of the second-access token and/or the expiration time of the second-access token may be carried in the account binding request and be sent to the first cloud platform.

At operation 508, the first cloud platform sends an account binding response to the second cloud platform; and the second cloud platform receives the account binding response sent by the first cloud platform.

After completing the account binding, the first cloud platform may send a response of a successful binding to the second cloud platform.

At operation 509, the second cloud platform binds the second account with the open identifier according to the account binding response.

The account binding response is configured to instruct the second cloud platform to bind the second account with the open identifier.

After receiving the account binding response, the second cloud platform determines that the first cloud platform has completed the account binding. At this time, the second cloud platform may locally bind the second account with the open identifier.

In some embodiments, the second cloud platform may further bind the second account with the second-access token.

In an embodiment, the second cloud platform may further bind the second account with the updated token of the second-access token and/or the expiration time of the second-access token.

At operation 510, after the association between the first account and the second account is completed, the client device sends a first-device binding request to the first cloud platform; and the first cloud platform receives the first-device binding request. The first-device binding request includes a device identifier and the identifier of the second cloud platform; and the device identifier is an identifier of the server device for accessing to the second cloud platform.

In the embodiments of the present disclosure, when the user wants to associate the server device in the second cloud platform with the first cloud platform, the user may send the device binding request to the first cloud platform through the client device. The binding request carries the identifier of the server device, and the identifier of the second cloud platform to which the server device belongs.

At operation 511, the first cloud platform sends a second-device binding request to the second cloud platform; the second cloud platform receives the second-device binding request sent by the first cloud platform; and the second-device binding request includes the device identifier, the second-access token and the open identifier.

In some embodiments, the above-mentioned first-device binding request and the second-device binding request may further include device information such as a device model and manufacturer information of the server device, etc.

In the embodiments of the present disclosure, after receiving the device binding request sent by the above-mentioned client device, the first cloud platform may forward the device binding request to the second cloud platform, and during the forwarding process, the second-access token and open identifier may be added to the device binding request such that the second cloud platform may perform the verification based on the device binding.

The second-access token and open identifier in the device binding request may be queried and obtained by the first cloud platform based on the pre-established binding relationship.

At operation 512, after the verification based on the second-access token is passed, the second cloud platform binds the server device with the second account based on the open identifier and the device identifier.

In an embodiment, after receiving the second-device binding request, the second cloud platform may obtain the second-access token by querying the pre-established binding relationship according to the open identifier, and compare the obtained second-access token through querying with the second-access token carried in the second-device binding request. If the two are consistent, the second cloud platform may determine that the verification based on the second-access token is passed, query the second account based on the open identifier, and bind the service device with the second account.

Taking the first cloud platform as a O Cloud (Origin cloud) and the second cloud platform as a T Cloud (Target cloud) as an example, an APP belonging to the O Cloud obtains an AuthCode for the T Cloud. The AuthCode may be issued under a circumstance that the user does not have a T Cloud account; a T cloud identifier is carried during the requesting process. When the O Cloud delivers the AuthCode to the APP, it carries an access address registered by the T Cloud. The APP sends the AuthCode and an O cloud identifier to the above access address of the T cloud. The T Cloud sends the AuthCode to the O Cloud and applies for an Access Token (corresponding to the first-access token mentioned above) and an OpenID. The T Cloud initiates an account binding request to the O Cloud, and the request carries the Access Token (corresponding to the above-mentioned second-access token) assigned by the T Cloud to the O Cloud and a Refresh Token (corresponding to the updated token of the above-mentioned second-access token) and other information. Afterwards, the T Cloud and the O Cloud completed user binding respectively. The technical solution illustrated in the embodiments of the present disclosure may help the user without an account to complete user binding and access on the T Cloud, and does not require the user to do too much configuration work.

Figure 6:
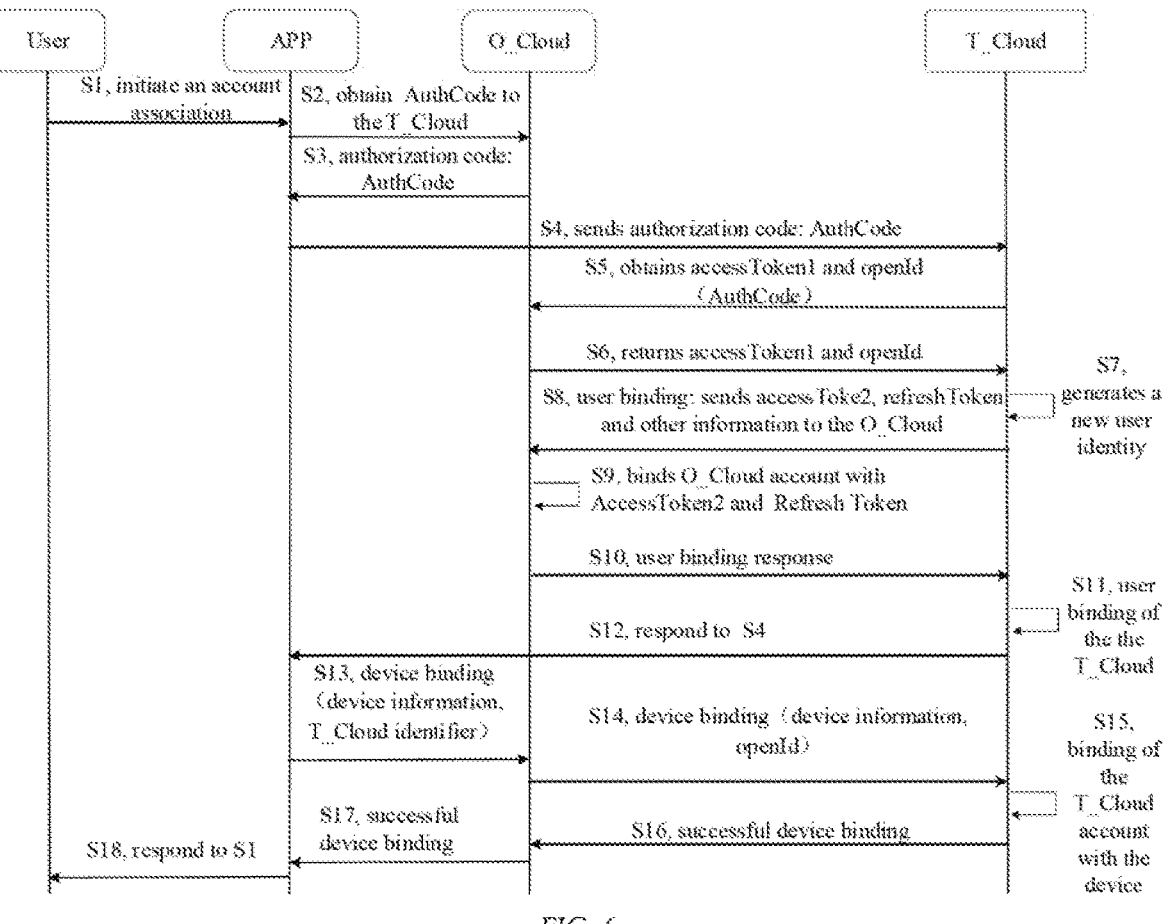
FIG. 6 is a schematic diagram of a binding of an account and a device involved in the embodiment illustrated in FIG. 5.

As illustrated in FIG. 6, which is a schematic diagram of account and device binding related to an embodiment of the present disclosure. As illustrated in FIG. 6, the account and device binding process may include the following operations.

At S1, the user initiates an account association process on an APP. The so-called account association process is to complete the binding of the user's accounts on the O_Cloud and the T_Cloud, such that the device registered with T_Cloud may be controlled through the APP in the O_Cloud.

At S2, the App requests the O_Cloud to distribute an AuthCode to the T_Cloud. Subsequently, the T_Cloud needs to apply for an Access Token from the O_Cloud based on the AuthCode. The request needs to carry an ID assigned by the O_Cloud to the T_Cloud. The above ID is generated through offline registration, which already exists in this process.

At S3, the O_Cloud sends its applied AuthCode to the APP. The response message carries the access address of the T_Cloud. This access address is further registered offline in the O_Cloud. The O_Cloud may confirm the access address based on the ID assigned at operation S1.

At S4, the APP sends the AuthCode to the T_Cloud; the message may further carry an ID (which may further be an URL) of the O_Cloud, an ClientID (assigned when the APP registers with the T_Cloud) of the APP and other information.

At S5, the T_Cloud applies for an Access Token and an OpenID from the O_Cloud; the AccessToken is configured for subsequent O_Cloud verification for access right of the T_Cloud. The OpenID is an identifier assigned by the O_Cloud. There is no user identity in the T_Cloud yet. Therefore, the T_Cloud generates a user identity and binds it with the OpenID. The user identity in the O Cloud is further bound with the OpenID, thus completing the user identity on the two cloud platforms.

At S6, the O_Cloud returns the AccessToken1 and the OpenID to the T_Cloud.

At S7, the T_Cloud generates a new user identity (may be generated based on the OpenID).

At S8, the T_Cloud sends a user binding request to the O_Cloud; the request needs to carry the Access Token1, an AccessToken2 issued by the T_Cloud to the O_Cloud, a Refresh Token, an expiration time of the AccessToken2, the OpenID and other information.

At S9, after receiving the above information, the O_Cloud completes the binding of the user's O_Cloud account with the OpenID, the AccessToken2, the Refresh Token, and the identifier of the T_Cloud. The so-called binding is to maintain the relationship between these elements.

At S10, notify the T_Cloud to complete the user binding.

At S11, after receiving the above message, the T_Cloud completes the user binding; performing the binding of the new user identity (i.e, the generated new account) generated at operation S7 with the OpenID; and the binding of the accessToken2 with the identifier of the O_Cloud may also be performed.

At S12, respond to the request of operation S4.

At S13, the APP initiates a device binding request to the O_Cloud. The message includes device information (an ID, a model, a manufacturer, etc.) and the T_Cloud identifier.

At S14, after receiving the above message, the O_Cloud initiates a device binding request to the T_Cloud. The request needs to carry the device information carried in the request at operation S13 as well as the AccessToken2 and the OpenID information.

At S15, the T_Cloud completes the binding of the T_Cloud account with the device. The device binding only requires completing the binding of the device and user identity and a series of necessary configurations after the device is accessed to the cloud platform.

At S16~S18, a successful binding response. If the device ID is newly generated during the binding process, it needs to be carried in the response message.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. The authorization code is provided to the authorized platform. The authorizing platform and the authorized platform may interact with each other through the authorization code. The account association interaction process does not require the participation of the client device. Therefore, there is no need to integrates program modules associated with other cloud platforms in the application installed on the client device, thereby reducing the capacity burden and complexity of the client and improving the efficiency of the development, update and maintenance of the client.

In an embodiment, the above-mentioned authorizing platform may be the second cloud platform, and the authorized platform may be the first cloud platform. In other words, after obtaining the authorization code issued by the second cloud platform, the first cloud platform may initiate the process of account association with the second cloud platform.

Figure 7:
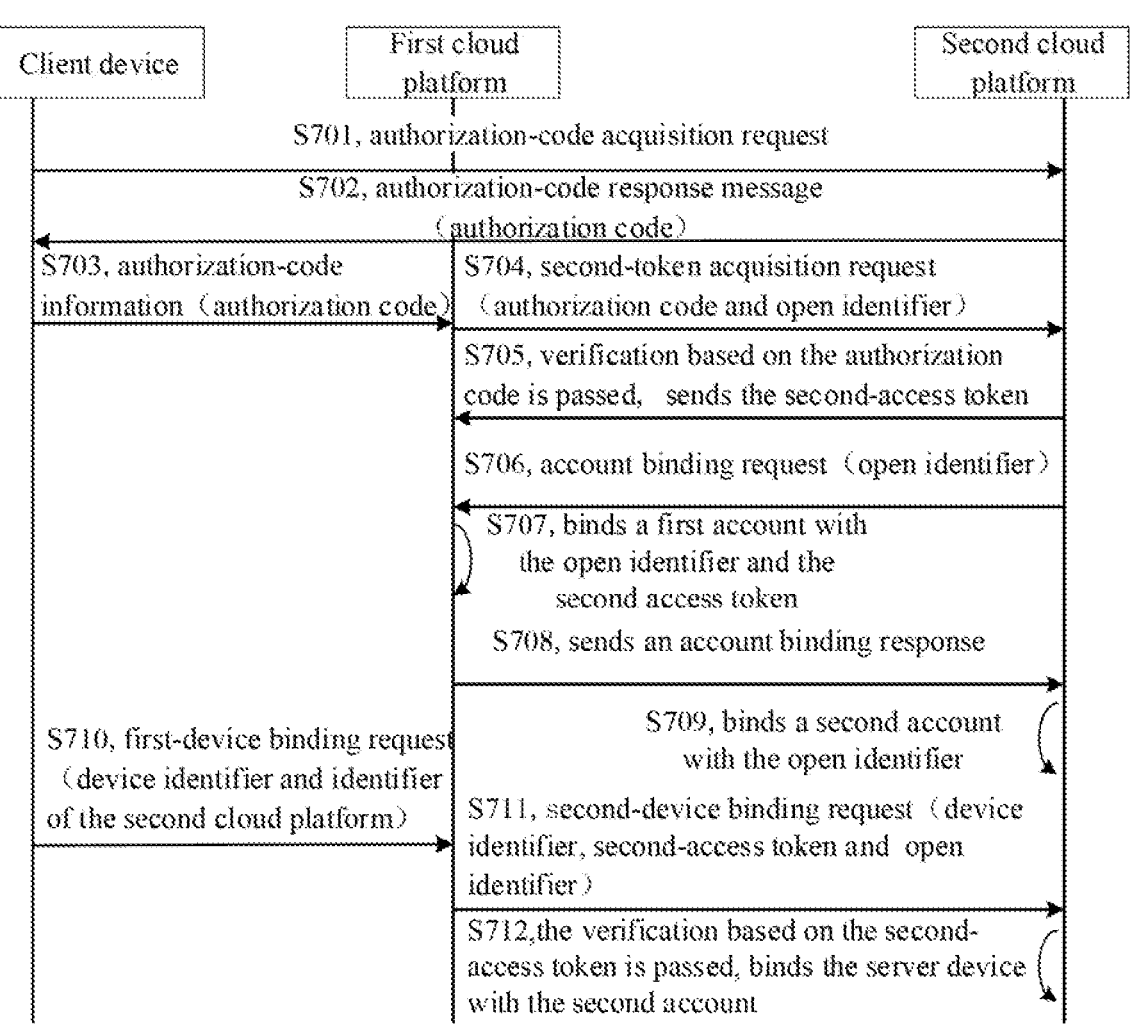
FIG. 7 is a flow chart of a method for account association according to an embodiment of the present disclosure.

As illustrated in FIG. 7, which is a flow chart of a method for account association according to an embodiment of the present disclosure. The method may be executed interactively between the client device, the first cloud platform and the second cloud platform. The method may include the following operations.

At operation 701, the client device sends an authorization-code acquisition request to the second cloud platform; and the second cloud platform receives the authorization-code acquisition request.

In the embodiments of the present disclosure, the authorization-code acquisition request may include the identifier of the first cloud platform. The identifier of the first cloud platform may be obtained or generated by the second cloud platform when the first cloud platform registers with the second cloud platform in advance.

The first cloud platform may register with the second cloud platform in advance. After the registration is completed, the identifier of the first cloud platform may be stored in the second cloud platform. Correspondingly, the first cloud platform may further store the identifier of the first cloud platform. After the subsequent client device establishes a connection with the first cloud platform, the first cloud platform may provide the identifier of the first cloud platform to the client device. When the user wants to establish the account association between the first cloud platform and the second cloud platform, the account association process may be initiated in the client device. At this time, the client device may send the authorization-code acquisition request including the identifier of the first cloud platform to the second cloud platform, thereby requesting the authorization code for the first cloud platform.

At operation 702, the second cloud platform sends an authorization-code response message to the client device; the client device receives the authorization-code response message sent by the second cloud platform, and the authorization-code response message includes the authorization code.

The second cloud platform generates the authorization-code response message based on the identifier of the first cloud platform included in the authorization-code acquisition request. The authorization-code response message includes the authorization code assigned to the first cloud platform.

In the embodiments of the present disclosure, the second cloud platform may store the above-mentioned authorization code and the identifier of the first cloud platform correspondingly, such that the authorization code may be verified in the subsequent account association process.

At operation 703, the client device sends the authorization-code information to the first cloud platform, the first cloud platform receives the authorization-code information sent by the client device correspondingly; and the authorization-code information includes the authorization code.

In an embodiment, the authorization-code information further includes at least one of the identifier of the second cloud platform and the identifier of the client device in the second cloud platform.

The identifier of the client device in the second cloud platform may be an identifier assigned to the client device by the second cloud platform when the client device registers with the second cloud platform.

After obtaining the authorization code requested by the client device, the first cloud platform and the second cloud platform may perform the account association interaction based on the authorization code to associate the first account with the second account. The first account is a user account of the client device logging in the first cloud platform, and the second account is a user account of the client device logging in the second cloud platform. For the above account association interaction process, please refer to the subsequent operations 704 to 509.

At operation 704, the first cloud platform sends a second-token acquisition request to the second cloud platform; the second cloud platform receives the second-token acquisition request sent by the first cloud platform; and the second-token acquisition request includes the authorization code and the open identifier.

At operation 705, after the verification based on the authorization code is passed, the second cloud platform sends the second-access token to the first cloud platform; and the first cloud platform receives the second-access token sent by the second cloud platform.

The second-access token is configured to access the second cloud platform by the first cloud platform.

In an embodiment, the second cloud platform may generate a second account after the verification based on the authorization code is passed.

In an embodiment, the second cloud platform may generate the second account based on the open identifier after the verification based on the authorization code is passed.

In an embodiment, the above-mentioned second cloud platform sending a second-access token to the first cloud platform includes the following operations.

The second cloud platform sends the second-access token to the first cloud platform, as well as an updated token of the second-access token and an expiration time of the second-access token.

Correspondingly, the first cloud platform receiving the second-access token sent by the second cloud platform includes the following operations.

The first cloud platform receives the second-access token, the updated token of the second-access token and the expiration time of the second-access token sent by the second cloud platform.

For the authorization code verification process and the second account generation process, reference may be made to the corresponding descriptions in the embodiments illustrated in FIG. 5 and will not be described again here.

At operation 706, the second cloud platform sends an account binding request to the first cloud platform; the first cloud platform receives the account binding request sent by the second cloud platform, and the account binding request includes the open identifier.

At operation 707, the first cloud platform binds the first account with the open identifier and the second-access token according to the account binding request.

In an embodiment, the account binding request is configured to instruct the first cloud platform to bind the first account with the open identifier, the second-access token, and the identifier of the second cloud platform. Correspondingly, the first cloud platform binds the first account with the open identifier, the second-access token and the identifier of the second cloud platform according to the account binding request.

At operation 708, the first cloud platform sends an account binding response to the second cloud platform; and the second cloud platform receives the account binding response sent by the first cloud platform.

The account binding response is configured to instruct second cloud platform to bind the second account with the open identifier.

At operation 709, the second cloud platform binds the second account with the open identifier according to the account binding response.

At operation 710, after the association between the first account and the second account is completed, the client device sends a first-device binding request to the first cloud platform; the first cloud platform receives the first-device binding request; the first-device binding request includes a device identifier and the identifier of the second cloud platform; and the device identifier is an identifier of the server device for accessing to the second cloud platform.

At operation 711, the first cloud platform sends a second-device binding request to the second cloud platform; the second cloud platform receives the second-device binding request sent by the first cloud platform; the second-device binding request includes the device identifier, the second-access token and the open identifier.

At operation 712, after the verification based on the second-access token is passed, the second cloud platform binds the server device with the second account based on the open identifier and the device identifier.

The authorization code verification, the token verification, and the device binding process in the embodiments of the present disclosure may refer to the description in the embodiments illustrated in FIG. 5 above, and will not be limited here.

As illustrated in FIG. 8, which is a schematic diagram of an account and device binding according to an embodiment of the present disclosure. As illustrated in FIG. 8, the account and device binding process may include the following operations.

S1, a user initiates an account association process on an APP. The so-called account association process is to complete the binding of the user's accounts on an O_Cloud and a T Cloud, such that a device registered with the T_Cloud may be controlled through the APP on the O_Cloud.

At S2, the App requests the T_Cloud to distribute an AuthCode to the O Cloud. Subsequently, the O_Cloud needs to apply for an Access Token from the T_Cloud based on the AuthCode.

At S3, the T_Cloud sends its applied AuthCode to the APP.

At S4, the APP sends the AuthCode to the O_Cloud; the message may further carry an ID (may be a URL) of the T_Cloud.

At S5, the O_Cloud applies for an Access Token from the T_Cloud; the message needs to carry an OpenID generated by the O_Cloud. The AccessToken is configured for subsequent authentication of access right of the O_Cloud by the T_Cloud. The OpenID is an identifier assigned by the O_Cloud. There is no user identity on the T_Cloud yet. Therefore, the T_Cloud generates a user identity and binds it with the OpenID. The user identity on the O_Cloud is further bound with the OpenID, thus completing binding of the user identity on the two cloud platforms.

At S6, the T_Cloud generates a new user identity (possibly based on the OpenID).

At S7, the T_Cloud sends the Access Token and a Refresh Token to the O_Cloud.

At S8, the T_Cloud sends a user binding request to the O_Cloud, carrying the OpenID in the request.

At S9, after receiving the above information, the O_Cloud completes the binding of the user's O_Cloud account with the OpenID, the AccessToken, the Refresh Token, and the identifier of the T_Cloud. The so-called user binding is to maintain the relationship between these elements.

At S10, notify the T_Cloud to complete the user binding.

At S11, the user binding is completed on the T_Cloud.

At S12, the APP initiates a device binding request to the O_Cloud. The message includes device information (an ID, a model, a manufacturer, etc.) and the identifier of the T_Cloud.

At S13, after receiving the above message, the O_Cloud initiates the device binding request to the T_Cloud. This request needs to carry the AccessToken and the OpenID information.

At S14, the T_Cloud completes the binding of the T_Cloud account with the device. The device binding only requires completing the binding of the device and the user identity and a series of necessary configurations after the device is accessed to the cloud platform.

At S15~S17, a successful binding response. If a device ID is newly generated during the binding process, it needs to be carried in the response message.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. The authorization code is provided to the authorized platform. The authorizing platform and the authorized platform may interact with each other through the authorization code. The account association interaction process does not require the participation of the client device. Therefore, there is no need to integrates program modules associated with other cloud platforms on the application installed in the client device, thereby reducing the capacity burden and complexity of the client and improving the efficiency of the development, update and maintenance of the client.

The following are device embodiments of the present disclosure, which may be configured to execute method embodiments of the present disclosure. For details not disclosed in the device embodiments of the present disclosure, please refer to the method embodiments of the present disclosure.

As illustrated in FIG. 9, which is a block diagram of a device for account association according to an embodiment of the present disclosure. The device has a function of implementing the above method embodiments for account association. The function may be implemented by hardware, or may be implemented by hardware through executing corresponding software. The device may be the client device introduced above, or may be set in the client device. As illustrated in FIG. 9, the device may include an authorization-code acquisition module 901 and an authorization-code sending module 902.

The authorization-code acquisition module 901 is configured to obtain an authorization code from an authorizing platform; the authorizing platform is one of the first cloud platform and the second cloud platform; and the first cloud platform is the cloud platform to which the client device belongs.

The authorization-code sending module 902 is configured to send the authorization code to the authorized platform; the authorization code is configured for account association interaction between the authorized platform and the authorizing platform, so as to associate the first account with the second account.

The first account is a user account of the client device logging in the first cloud platform, and the second account is a user account of the client device logging in the second cloud platform. The authorized platform is another cloud platform other than the authorized platform in the first cloud platform and the second cloud platform.

In an embodiment, in response to the authorizing platform being the first cloud platform, the authorization-code acquisition module 901 is configured to: send an authorization-code acquisition request to the first cloud platform; receive an authorization-code response message sent by the first cloud platform, in which the authorization-code response message includes the authorization code; and send authorization-code information to the second cloud platform, in which the authorization-code information includes the authorization code.

In an embodiment, the authorization-code acquisition request includes an identifier of the second cloud platform, and the authorization-code response message further includes an address of the second cloud platform.

The authorization-code acquisition module 901 is configured to send the authorization-code information to the second cloud platform according to the address of the second cloud platform.

In an embodiment, the authorization-code information further includes at least one of an identifier of the first cloud platform and an identifier of the client device in the second cloud platform.

In an embodiment, in response to the authorizing platform being the second cloud platform, the authorization-code acquisition module 901 is configured to: send an authorization-code acquisition request to the second cloud platform;

receive an authorization-code response message sent by the second cloud platform, in which the authorization-code response message includes the authorization code; and send the authorization-code information to the first cloud platform, in which the authorization-code information includes the authorization code.

In an embodiment, the authorization-code information further includes an identifier of the second cloud platform.

In an embodiment, the apparatus further includes a device binding request module.

The device binding request module is configured to send a first-device binding request to the first cloud platform after the association between the first account and the second account is completed. The first-device binding request includes a device identifier and the identifier of the second cloud platform. The device identifier is an identifier of the server device for accessing to the second cloud platform;

The first-device binding request is configured to instruct the first cloud platform to send a second-device binding request to the second cloud platform. The second-device binding request is configured to instruct the second cloud platform to bind the server device with the second account.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. The authorization code is provided to the authorized platform, such that the subsequent authorizing platform and the authorized platform may interact with the account through the authorization code. Since the account association interaction process does not require the participation of the client device, there is no need to integrate program modules associated with other cloud platforms in the applications installed on the client device, thereby reducing the capacity burden and complexity of the client and improving the efficiency of the development, update and maintenance of the client.

As illustrated in FIG. 10, which is a block diagram of a device for account association according to an embodiment of the present disclosure. The device has the function of implementing the above method embodiments for account association. The function may be implemented by hardware, or may be implemented by hardware through executing corresponding software. The device may be the authorizing device introduced above, or may be set in the authorizing device. The authorizing platform is one of the first cloud platform and the second cloud platform. As illustrated in FIG. 10, the device may include an authorization-code sending module 1001 and an association module 1002.

The authorization-code sending module 1001 is configured to send an authorization code to a client device. The authorization code is configured to send the authorization code to an authorized device by the client device. The first cloud platform is the cloud platform to which the client device belongs.

The association module 1002 is configured to perform account association interaction with an authorized platform based on the authorization code, so as to associate the first account and the second account. The authorized platform is another cloud platform other than the authorized platform in the first cloud platform and the second cloud platform.

The first account is a user account of the client device logging in the first cloud platform, and the second account is a user account of the client device logging in the second cloud platform.

In an embodiment, the authorization-code sending module 1001 is configured to: receive an authorization-code acquisition request sent by the client device; and send an authorization-code response message to the client device, in which the authorization-code response message includes the authorization code.

In an embodiment, in response to the authorizing platform being the first cloud platform, the authorization-code acquisition request includes an identifier of the second cloud platform, and the authorization-code response message further includes an address of the second cloud platform.

In an embodiment, in response to the authorizing platform being the first cloud platform, the association module 1002 is configured to receive a first-token acquisition request sent by the second cloud platform, in which the first-token acquisition request includes the authorization code; send a first-access token and an open identifier to the second cloud platform after a verification based on the authorization code is passed, in which the open identifier is an identifier assigned by the first cloud platform to the client device; receive an account binding request sent by the second cloud platform, in which the account binding request includes the first-access token and the second-access token; bind the first account with the open identifier and the second-access token after a verification based on the first-access token is passed; and send an account binding response to the second cloud platform; in which the account binding response is configured to instruct the second cloud platform to bind the second account with the open identifier.

In an embodiment, the association module 1002 is configured to send the first-access token, the open identifier, an updated token of the first-access token, and an expiration time of the first-access token to the second cloud platform.

In an embodiment, the account binding request further includes the open identifier, an updated token of the second-access token, and an expiration time of the second-access token.

In an embodiment, the association module 1002 is configured to bind the first account with the open identifier, the second-access token, and the identifier of the second cloud platform.

In an embodiment, the apparatus further includes a first-device binding request receiving module and a second-device binding request sending module.

The first-device binding request receiving module is configured to receive a first-device binding request; the first-device binding request includes a device identifier and an identifier of the second cloud platform; and the device identifier is an identifier of a server device for accessing to the second cloud platform.

The second-device binding request sending module is configured to send a second-device binding request to the second cloud platform; and the second-device binding request is configured to instruct the second cloud platform to bind the server device with the second account. The second-device binding request includes the device identifier, the second-access token and the open identifier.

In an embodiment, in response to the authorizing platform being the second cloud platform, the association module 1002 is configured to receive a second-token acquisition request sent by the first cloud platform, in which the second-token acquisition request includes the authorization code and an open identifier and the open identifier is an identifier assigned to the client device by the first cloud platform; send a second-access token to the first cloud platform after the verification according to the authorization code is passed; send an account binding request to the first cloud platform, in which the account binding request includes the open identifier and the account binding request is configured to instruct the first cloud platform to bind the first account with the open identifier and the second-access token; receive the account binding response sent by the first cloud platform; and bind the second account with the open identifier according to the account binding response.

In an embodiment, the association module 1002 is configured to send the second-access token, an updated token of the second-access token and an expiration time of the second-access token to the first cloud platform.

In an embodiment, the account binding request is configured to instruct the first cloud platform to bind the first account with the open identifier, the second-access token and the identifier of the second cloud platform.

In an embodiment, the apparatus further includes a second-device binding request receiving module and a device binding module. The second-device binding request receiving module is configured to receive a second-device binding request sent by the first cloud platform. The second-device binding request includes the device identifier, the second-access token and the open identifier.

The device binding module is configured to bind the server device to the second account according to the open identifier and the device identifier after a verification based on the second-access token is passed.

In an embodiment, the apparatus further includes an account generation module.

The account generation module is configured to generate the second account after the verification based on the authorization code is passed.

In an embodiment, the account generation module is configured to generate the second account based on the open identifier after the verification based on the authorization code is passed.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. The authorization code is provided to the authorized platform. Subsequently, the authorizing platform and the authorized platform may interact with each other through the authorization code. The account association interaction process does not require the participation of the client device, so there is no need to integrate program modules associated with other cloud platforms on the applications installed in the client device, thereby reducing the capacity burden and complexity of the client and improving the efficiency of the development, update and maintenance of the client.

Figure 11:
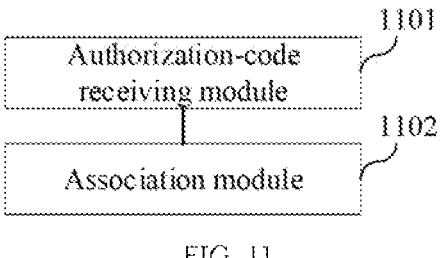
FIG. 11 is a block diagram of a device for account association according to an embodiment of the present disclosure.

As illustrated in FIG. 11, which is a block diagram of a device for account association according to an embodiment of the present disclosure. The device has a function of implementing the above method embodiments for account association. The function may be implemented by hardware, or may be implemented by hardware through executing corresponding software. The device may be the authorized device introduced above, or may be set in the authorized device. The authorized platform is one of the first cloud platform and the second cloud platform. As illustrated in FIG. 11, the device may include an authorization-code receiving module 1101 and an association module 1102.

The authorization-code receiving module 1101 is configured to receive an authorization code sent by a client device; the authorization code is obtained by the client device from the authorizing platform; and the first cloud platform is a cloud platform to which the client device belongs. The authorized platform is another cloud platform other than the authorized platform in the first cloud platform and the second cloud platform.

The association module 1102 is configured to perform account association interaction with the authorizing platform based on the authorization code, so as to associate the first account with the second account.

The first account is a user account of the client device logging in the first cloud platform, and the second account is a user account of the client device logging in the second cloud platform.

In an embodiment, in response to the authorized platform being the second cloud platform, the association module 1102 is configured to send a first-token acquisition request to the first cloud platform, in which the first-token acquisition request includes the authorization code; receive a first-access token and an open identifier sent by the first cloud platform, in which the open identifier is an identifier assigned by the first cloud platform to the client device; send an account binding request to the first cloud platform, in which the account binding request includes the first-access token and a second-access token and the account binding request is configured to instruct the first cloud platform to bind the first account with the open identifier and the second-access token; receive an account binding response sent by the first cloud platform; and bind the second account with the open identifier according to the account binding response.

In an embodiment, the association module 1102 is configured to receive the first-access token, the open identifier, the updated token of the first-access token and the expiration time of the first-access token sent by the first cloud platform.

In an embodiment, the account binding request further includes the open identifier, an updated token of the second-access token, and an expiration time of the second-access token.

In an embodiment, the account binding request is configured to instruct the first cloud platform to bind the first account with the open identifier, the second-access token and the identifier of the second cloud platform.

In an embodiment, the apparatus further includes a second-device binding request receiving module and a device binding module.

The second-device binding request receiving module is configured to receive a second-device binding request sent by the first cloud platform. The second-device binding request includes the device identifier, the second-access token and the open identifier.

The device binding module is configured to bind the server device with the second account according to the open identifier and the device identifier after a verification based on the second-access token is passed.

In an embodiment, the apparatus further includes an account generation module.

The account generation module is configured to generate the second account.

In an embodiment, the account generation module is configured to generate the second account according to the open identifier.

In an embodiment, in response to the authorized platform being the first cloud platform, the association module 1102 is configured to send a second-token acquisition request to the second cloud platform, in which the second-token acquisition request includes the authorization code and an open identifier and the open identifier is an identifier assigned to the client device by the first cloud platform; receive the second-access token sent by the second cloud platform; receive an account binding request sent by the second cloud platform, in which the account binding request includes the open identifier; bind the first account with the open identifier and the second-access token according to the account binding request; and send an account binding response to the second cloud platform, in which the account binding response is configured to instruct the second cloud platform to bind the second account with the open identifier.

In an embodiment, the association module 1102 is configured to receive the second-access token, an updated token of the second-access token and an expiration time of the second-access token sent by the second cloud platform.

In an embodiment, the association module 1102 is configured to bind the first account with the open identifier, the second-access token and the identifier of the second cloud platform according to the account binding request.

In an embodiment, the apparatus further includes a first-device binding request receiving module and a second-device binding request sending module.

The first-device binding request receiving module is configured to receive a first-device binding request sent by the client device. The first-device binding request includes a device identifier and an identifier of the second cloud platform. The device identifier is an identifier of a server device for accessing to the second cloud platform.

The second-device binding request sending module is configured to send a second-device binding request to the second cloud platform. The second-device binding request is configured to instruct the second cloud platform to bind the server device with the second cloud platform. The second-device binding request includes the device identifier, the second-access token and the open identifier.

In summary, according to the technical solution illustrated in the embodiments of the present disclosure, before the account association interaction is performed between the first cloud platform and the second cloud platform, the authorization code of the authorized platform is first obtained from the authorizing platform in the two cloud platforms through the client device. The authorization code is provided to the authorized platform. Subsequently, the authorizing platform and the authorized platform may interact with each other through the authorization code. The account association interaction process does not require the participation of the client device, so there is no need to integrate program modules associated with other cloud platforms on the applications installed in the client device, thereby reducing the capacity burden and complexity of the client and improving the efficiency of the development, update and maintenance of the client.

When the device provided in the above embodiment implements its functions, the division of the above functional modules is used as an example only. In practical applications, the above functions may be allocated to different functional modules according to actual needs. In other words, the content structure of the device is divided into different functional modules to complete all or part of the functions described above.

Regarding the apparatus in the above embodiments, the specific operation manner in which each module performs has been described in detail in the embodiments related to the method, and will not be described in detail here.

Figure 12:
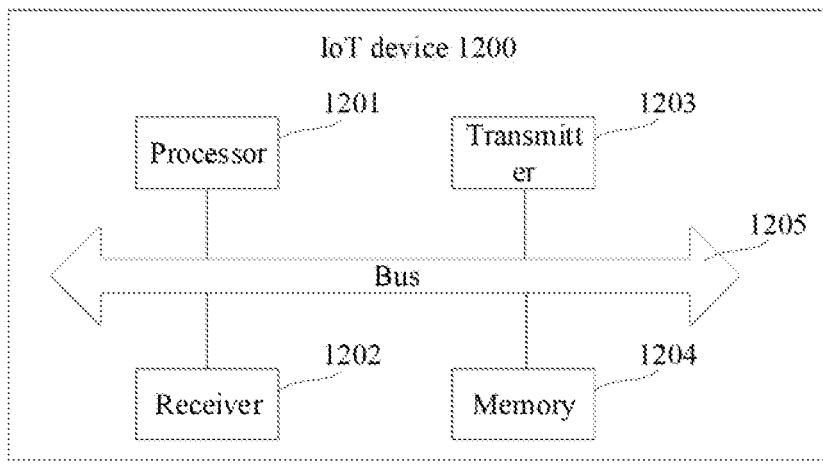
FIG. 12 is a schematic structural diagram of an IoT device according to an embodiment of the present disclosure.

As illustrated in FIG. 12, which is a schematic structural diagram of an IoT device 1200 according to an embodiment of the present disclosure. The IoT device 1200 may include a processor 1201, a receiver 1202, a transmitter 1203, a memory 1204, and a bus 1205.

The processor 1201 includes one or more processing cores. The processor 1201 executes various functional applications and information processing by running a software programs and modules.

The receiver 1202 and the transmitter 1203 may be implemented as a communication component, and the communication component may be a communication chip. This communication chip may also be called a transceiver.

The memory 1204 is accessed to the processor 1201 through the bus 1205.

The memory 1204 may be configured to store a computer program, and the processor 1201 is configured to execute the computer program to implement various operations performed by the terminal in the above method embodiments.

Additionally, the memory 1204 may be implemented by any type of volatile or non-volatile storage device, or combination thereof, including but not limited to: a magnetic or optical disk, an electrically erasable programmable read-only memory, an erasable programmable read-only memory, a static ready-access memory, a read-only memory, magnetic memory, a flash memory, a programmable read-only memory.

In an exemplary embodiment, the IoT device includes a processor, a memory, and a transceiver (the transceiver may include a receiver and a transmitter, the receiver is configured to receive information, and the transmitter is configured to send information).

In response to the IoT device being implemented as a client device, the processor is configured to execute an instruction stored in the memory to implement all or part of the operations in the above-mentioned methods executed by the client device illustrated in FIG. 2, FIG. 5 or FIG. 7, which will not be repeated here.

In response to the IoT device being implemented as an authorizing platform, the processor is configured to execute an instruction stored in the memory to implement all or part of the operations in the above-mentioned methods illustrated executed by the authorizing platform in FIG. 3, FIG. 5 or FIG. 7, which will not be repeated here.

In response to the IoT device being implemented as an authorized platform, the processor is configured to execute an instruction stored in the memory to implement all or part of the operations in the above-mentioned methods executed by the authorized platform illustrated in FIG. 4, FIG. 5 or FIG. 7, which will not be repeated here.

The embodiments of the present disclosure further provide a computer-readable storage medium. A computer program is stored in the storage medium. The computer program is loaded and executed by a processor to implement all or part of the operations in the above-mentioned methods executed by the client device, the authorizing platform or the authorized platform illustrated in FIG. 2, FIG. 3, FIG. 4, FIG. 5 or FIG. 7.

The present disclosure further provides a chip. The chip is configured to run in an IoT device, to cause the IoT device to implement all or part of the operations in the above-mentioned methods executed by the client device, the authorizing platform or the authorized platform illustrated in FIG. 2, FIG. 3, FIG. 4, FIG. 5 or FIG. 7.

The present disclosure further provides a computer program product. The computer program product or computer program includes a computer instruction, and the computer instruction is stored in a computer-readable storage medium. The processor of the IoT device reads the computer instruction from the computer-readable storage medium, and the processor executes the computer instruction to cause the IoT device to implement all or part of the operations in the above-mentioned methods executed by the client device, the authorizing platform or the authorized platform illustrated in FIG. 2, FIG. 3, FIG. 4, FIG. 5 or FIG. 7.

The present disclosure further provides a computer program. The computer program is executed by the processor of the IoT device to implement all or part of the operations in the above-mentioned methods executed by the client device, the authorizing platform or the authorized platform illustrated in FIG. 2, FIG. 3, FIG. 4, FIG. 5 or FIG. 7.

Those skilled in the art should realize that in one or more of the above examples, the functions described in the embodiments of the present disclosure may be implemented by using hardware, software, firmware, or any combination thereof. When implemented by using software, the functions may be stored on or transmitted over as one or more instructions or code on a computer-readable medium. The computer-readable media includes a computer storage media and a communication media including any media that facilitates transfer of a computer program from one place to another. The storage media may be any available media that may be accessed by a general purpose or special purpose computer.

The above are only exemplary embodiments of the present disclosure and are not intended to limit the present disclosure. Any modifications, equivalent substitutions, improvements, etc. made within the spirit and principles of the present disclosure shall be included in the protection scope of the present disclosure.

What is claimed is:

1. A method for account association, performed by a client device, comprising:

obtaining an authorization code from an authorizing platform; wherein the authorizing platform is one of a first cloud platform and a second cloud platform; and the first cloud platform is a cloud platform to which the client device belongs; and sending the authorization code to an authorized platform; wherein the authorization code is configured for account association interaction between the authorized platform and the authorizing platform, so as to associate a first account with a second account;

wherein the first account is a user account of the client device logging in the first cloud platform, and the second account is a user account of the client device logging in the second cloud platform; and the authorized platform is another cloud platform other than the authorizing platform in the first cloud platform and the second cloud platform.

2. The method according to claim 1, wherein in response to the authorizing platform being the first cloud platform, the obtaining an authorization code from an authorizing platform comprises:

sending an authorization-code acquisition request to the first cloud platform;

receiving an authorization-code response message sent by the first cloud platform, wherein the authorization-code response message comprises the authorization code; and sending authorization-code information to the second cloud platform, wherein the authorization-code information comprises the authorization code.

3. The method according to claim 2, wherein the authorization-code acquisition request comprises an identifier of the second cloud platform.

4. The method according to claim 2, wherein the authorization-code response message comprises an address of the second cloud platform;

the sending authorization-code information to the second cloud platform comprises:

sending the authorization-code information to the second cloud platform according to the address of the second cloud platform.

5. The method according to claim 2, wherein the authorization-code information further comprises at least one of an identifier of the first cloud platform and an identifier of the client device in the second cloud platform.

6. The method according to claim 1, wherein in response to the authorizing platform is the second cloud platform, the obtaining an authorization code from an authorizing platform comprises:

sending an authorization-code acquisition request to the second cloud platform;

receiving an authorization-code response message sent by the second cloud platform, wherein the authorization-code response message comprises the authorization code; and sending authorization-code information to the first cloud platform, wherein the authorization-code information comprises the authorization code.

7. The method according to claim 6, wherein the authorization-code information further comprises an identifier of the second cloud platform.

8. The method according to claim 1, further comprising:

sending a first-device binding request is to the first cloud platform after completing an association between the first account and the second account; wherein the first-device binding request comprises a device identifier and an identifier of the second cloud platform; and the device identifier is an identifier of a server device for accessing to the second cloud platform;

wherein the first-device binding request is configured to instruct the first cloud platform to send a second-device binding request to the second cloud platform, and the second-device binding request is configured to instruct the second cloud platform to bind the server device with the second account.

9. A method for account association, performed by an authorizing platform, wherein the authorizing platform is one of a first cloud platform and a second cloud platform; and the method comprises:

sending an authorization code to a client device; wherein the authorization code is configured to be sent to an authorized platform by the client device; the first cloud platform is a cloud platform to which the client device belongs; and performing account association interaction with the authorized platform based on the authorization code to associate a first account and a second account; wherein the authorized platform is another cloud platform other than the authorizing platform in the first cloud platform and the second cloud platform;

wherein the first account is a user account of the client device logging in the first cloud platform, and the second account is a user account of the client device logging in the second cloud platform.

10. The method according to claim 9, wherein the sending an authorization code to a client device comprises:

receiving an authorization-code acquisition request sent by the client device; and sending an authorization-code response message to the client device, wherein the authorization-code response message comprises the authorization code.

11. The method according to claim 10, wherein in response to the authorizing platform being the first cloud platform, the authorization-code acquisition request comprises an identifier of the second cloud platform.

12. The method according to claim 10, wherein in response to the authorizing platform being the first cloud platform, the authorization-code response message comprises an address of the second cloud platform.

13. The method according to claim 10, wherein in response to the authorizing platform being the first cloud platform, the performing account association interaction with the authorized platform based on the authorization code comprises:

receiving a first-token acquisition request sent by the second cloud platform, wherein the first-token acquisition request comprises the authorization code;

sending a first-access token and an open identifier to the second cloud platform after a verification based on the authorization code is passed; wherein the open identifier is an identifier assigned by the first cloud platform to the client device;

receiving an account binding request sent by the second cloud platform, wherein the account binding request comprises the first-access token and a second-access token;

binding the first account with the open identifier and the second-access token after a verification based on the first-access token is passed; and sending an account binding response to the second cloud platform; wherein the account binding response is configured to instruct the second cloud platform to bind the second account with the open identifier.

14. The method according to claim 13, wherein the sending a first-access token and an open identifier to the second cloud platform comprises:

sending the first-access token, the open identifier, an updated token of the first-access token, and an expiration time of the first-access token to the second cloud platform.

15. The method according to claim 13, further comprising:

receiving a first-device binding request; wherein the first-device binding request comprises a device identifier and an identifier of the second cloud platform; and the device identifier is an identifier of a server device for accessing to the second cloud platform;

sending a second-device binding request to the second cloud platform, wherein the second-device binding request is configured to instruct the second cloud platform to bind the server device with the second account; the second-device binding request comprises the device identifier, the second-access token and the open identifier.

16. The method according to claim 9, wherein in response to the authorizing platform being the second cloud platform, the performing account association interaction with the authorized platform based on the authorization code comprises:

receiving a second-token acquisition request sent by the first cloud platform, wherein the second-token acquisition request comprises the authorization code and an open identifier; and the open identifier is an identifier assigned to the client device by the first cloud platform;

sending a second-access token to the first cloud platform after a verification based on the authorization code is passed;

sending an account binding request to the first cloud platform, wherein the account binding request comprises the open identifier; the account binding request is configured to instruct the first cloud platform to bind the first account with the open identifier and the second-access token;

receiving an account binding response sent by the first cloud platform; and binding the second account with the open identifier according to the account binding response.

17. The method according to claim 16, wherein the sending a second-access token to the first cloud platform comprises:

sending the second-access token, an updated token of the second-access token, and an expiration time of the second-access token to the first cloud platform.

18. The method according to claim 16, wherein the account binding request is configured to instruct the first cloud platform to bind the first account with the open identifier, the second-access token and the identifier of the second cloud platform.

19. The method according to claim 16, further comprising:

generating the second account after a verification based on the authorization code is passed.

20. An IoT device, wherein the IoT device is implemented as a client device, the IoT device comprises a processor, a memory, and a transceiver; and the processor is configured to execute an instruction stored in the memory to implement a method for account association, wherein the method comprises:

obtaining an authorization code from an authorizing platform; wherein the authorizing platform is one of a first cloud platform and a second cloud platform; and the first cloud platform is a cloud platform to which the client device belongs; and sending the authorization code to an authorized platform; wherein the authorization code is configured for account association interaction between the authorized platform and the authorizing platform, so as to associate a first account with a second account;

wherein the first account is a user account of the client device logging in the first cloud platform, and the second account is a user account of the client device logging in the second cloud platform; and the authorized platform is another cloud platform other than the authorizing platform in the first cloud platform and the second cloud platform.

* * * * *